(12) United States Patent
Park et al.

(10) Patent No.: US 8,768,383 B2
(45) Date of Patent: Jul. 1, 2014

(54) METHOD FOR PROVIDING CONTROL INFORMATION USING THE PAGING PROCEDURE

(75) Inventors: Sung Jun Park, Gyeonggi-do (KR);
Young Dae Lee, Gyeonggi-do (KR);
Seung June Yi, Gyeonggi-do (KR);
Sung Duck Chun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 12/677,911

(22) PCT Filed: Sep. 11, 2008

(86) PCT No.: PCT/KR2008/005391
§ 371 (c)(1),
(2), (4) Date: Mar. 12, 2010

(87) PCT Pub. No.: WO2009/035282
PCT Pub. Date: Mar. 19, 2009

(65) Prior Publication Data
US 2010/0255859 A1 Oct. 7, 2010

Related U.S. Application Data

(60) Provisional application No. 60/971,921, filed on Sep. 13, 2007, provisional application No. 60/984,711, filed on Nov. 1, 2007, provisional application No. 61/019,575, filed on Jan. 7, 2008.

(30) Foreign Application Priority Data

Sep. 11, 2008 (KR) ........................ 10-2008-0089828

(51) Int. Cl.
*H04W 68/00* (2009.01)

(52) U.S. Cl.
USPC ............................................ 455/458; 370/329

(58) Field of Classification Search
USPC ..................................... 455/458; 370/313, 329
See application file for complete search history.

(56) References Cited

U.S. PATENT DOCUMENTS 6,388,997 B1    5/2002   Scott
6,421,334 B1    7/2002   Baines
(Continued)

FOREIGN PATENT DOCUMENTS

EP          2174520       4/2010
JP        2000151694      5/2000
(Continued)

OTHER PUBLICATIONS

3rd Generation Partnership Project (3GPP), "Technical Specification Group Radio Access Network; Synchronisation in UTRAN Stage 2 (Release 7)", 3GPP TS 25.402 v7.5.0, Dec. 2007.

(Continued)

*Primary Examiner* — Myron K Wyche
(74) *Attorney, Agent, or Firm* — Lee, Hong, Degerman, Kang & Waimey (57) ABSTRACT

A method for a user equipment (UE) to receive control information from a network in a wireless mobile communication system is provided. In the method, the UE receives a paging identifier indicating whether or not a paging message to be transmitted to the user equipment is present and receives the paging message including a type indicator indicating a paging type, according to the paging identifier.

4 Claims, 8 Drawing Sheets

(56) References Cited

U.S. PATENT DOCUMENTS

| | | |
|---|---|---|
| 6,434,389 B1 | 8/2002 | Meskanen et al. |
| 6,870,824 B1 | 3/2005 | Kim et al. |
| 7,209,747 B2 | 4/2007 | Chen |
| 7,310,336 B2 | 12/2007 | Malkamaki |
| 7,921,348 B2 | 4/2011 | Seidel et al. |
| 8,131,295 B2 | 3/2012 | Wang et al. |
| 8,320,327 B2 | 11/2012 | Pani et al. |
| 2001/0021661 A1 | 9/2001 | Pautonnier |
| 2001/0024956 A1 | 9/2001 | You et al. |
| 2002/0126629 A1 | 9/2002 | Jiang et al. |
| 2003/0224790 A1 | 12/2003 | Choi |
| 2004/0162074 A1 | 8/2004 | Chen |
| 2004/0208142 A1 | 10/2004 | Saw |
| 2005/0041681 A1 | 2/2005 | Lee et al. |
| 2005/0190712 A1 | 9/2005 | Lee et al. |
| 2005/0220042 A1 | 10/2005 | Chang et al. |
| 2005/0249163 A1 | 11/2005 | Kim et al. |
| 2005/0287957 A1 | 12/2005 | Lee et al. |
| 2006/0035662 A1 | 2/2006 | Jeong et al. |
| 2006/0104225 A1* | 5/2006 | Kim et al. ............ 370/313 |
| 2006/0116136 A1* | 6/2006 | Noma ................ 455/458 |
| 2006/0251023 A1 | 11/2006 | Choi |
| 2007/0047547 A1 | 3/2007 | Conner et al. |
| 2007/0049325 A1 | 3/2007 | Lee |
| 2007/0115894 A1 | 5/2007 | Herrmann et al. |
| 2007/0183372 A1 | 8/2007 | Janko et al. |
| 2007/0201424 A1 | 8/2007 | Kobayashi et al. |
| 2007/0202892 A1 | 8/2007 | Voyer |
| 2007/0250751 A1 | 10/2007 | Cai et al. |
| 2007/0253393 A1 | 11/2007 | Tseng |
| 2007/0291688 A1 | 12/2007 | Jiang et al. |
| 2008/0043771 A1 | 2/2008 | Cho et al. |
| 2008/0081645 A1* | 4/2008 | Kim et al. ............ 455/458 |
| 2008/0119209 A1 | 5/2008 | Upp |
| 2008/0186892 A1 | 8/2008 | Damnjanovic |
| 2008/0188247 A1* | 8/2008 | Worrall ............... 455/458 |
| 2008/0205433 A1 | 8/2008 | Pihlaja et al. |
| 2008/0220784 A1 | 9/2008 | Somasundaram et al. |
| 2008/0226074 A1 | 9/2008 | Sammour et al. |
| 2008/0233941 A1 | 9/2008 | Jen |
| 2008/0268843 A1 | 10/2008 | Ore et al. |
| 2008/0318578 A1 | 12/2008 | Worrall |
| 2009/0034452 A1 | 2/2009 | Somasundaram et al. |
| 2009/0041240 A1 | 2/2009 | Parkvall et al. |
| 2009/0086853 A1 | 4/2009 | Ye |
| 2009/0088160 A1 | 4/2009 | Pani et al. |
| 2009/0111445 A1 | 4/2009 | Ratasuk et al. |
| 2009/0247211 A1 | 10/2009 | Kuroda |
| 2009/0318175 A1 | 12/2009 | Sandberg |
| 2010/0077272 A1 | 3/2010 | Peisa et al. |
| 2010/0091721 A1 | 4/2010 | Larmo et al. |
| 2010/0093386 A1 | 4/2010 | Damnjanovic et al. |
| 2010/0178923 A1 | 7/2010 | Yi et al. |
| 2010/0232301 A1 | 9/2010 | Omori |
| 2010/0284376 A1 | 11/2010 | Park et al. |
| 2010/0290427 A1 | 11/2010 | Sebire et al. |
| 2011/0268234 A1 | 11/2011 | Khandekar et al. |

FOREIGN PATENT DOCUMENTS

| | | |
|---|---|---|
| JP | 2002268697 | 9/2002 |
| JP | 2003087317 | 3/2003 |
| JP | 2004349882 | 12/2004 |
| JP | 2005122441 | 5/2005 |
| JP | 2005530463 | 10/2005 |
| JP | 2006506892 | 2/2006 |
| KR | 10-2004-0008228 | 1/2004 |
| KR | 10-2005-0014984 | 2/2005 |
| KR | 10-2005-0028254 | 3/2005 |
| KR | 10-2005-0080946 | 8/2005 |
| KR | 10-2006-0024756 | 3/2006 |
| KR | 10-0556589 | 3/2006 |
| KR | 10-2006-0069106 | 6/2006 |
| KR | 10-2007-0080188 | 8/2007 |
| KR | 10-2007-0120453 | 12/2007 |
| WO | 03027860 | 4/2003 |
| WO | 2004004163 | 1/2004 |
| WO | 2005091668 | 9/2005 |
| WO | 2006035501 | 4/2006 |
| WO | 2006-096036 | 9/2006 |
| WO | 2006-118426 | 11/2006 |
| WO | 2006118738 | 11/2006 |

OTHER PUBLICATIONS

Nokia Siemens Networks, "Change Request", R2-074504, 3GPP TSG-RAN2 Meeting #59bis, Oct. 2007.

Nokia Siemens Networks et al., "CS over HSDPA", 3GPP TSG-RAN WG2 Meeting #59bis, Oct. 2007.

Nokia Siemens Networks et al., "CS over HSPA impact to specification", R2-074017, 3GPP TSG-RAN-WG2 Meeting #59bis, Oct. 2007.

Nokia Siemens Networks, et al., "CS Over HSPA Impact to Specification", 3GPP TSG-RAN-WG2 Meeting #59bis, R2-074017, Oct. 2007.

In the U.S. Appl. No. 12/738,278, Final Office Action dated Oct. 24, 2012, 9 pages.

U.S. Appl. No. 12/811,613, Office Action dated Dec. 28, 2012, 10 pages.

U.S. Appl. No. 12/677,739, Office Action dated Dec. 21, 2012, 9 pages.

3GPP, "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.0.0, Dec. 2007, 23 pages.

U.S. Appl. No. 12/811,768, Final Office Action dated Jan. 17, 2013, 16 pages.

U.S. Appl. No. 12/677,739, Final Office Action dated Jun. 6, 2013, 10 pages.

Nokia Corp., et al., "Prioritisation in UTRAN-LTE interworking," 3GPP TSG-RAN WG2 Meeting #60, R2-075063, Nov. 2007, 6 pages.

European Patent Office Application Serial No. 08022393.6, Search Report dated Aug. 6, 2013, 8 pages.

United States Patent and Trademark Office U.S. Appl. No. 12/677,739, Office Action dated Mar. 24, 2014, 10 pages.

* cited by examiner

METHOD FOR PROVIDING CONTROL INFORMATION USING THE PAGING PROCEDURE

CROSS-REFERENCE TO RELATED APPLICATIONS

This application is the National Stage filing under 35 U.S.C. 371 of International Application No. PCT/KR2008/005391, filed on Sep. 11, 2008 which claims the benefit of earlier filing date and right of priority to Korean Patent Application No. 10-2008-0089828, filed on Sep. 11, 2008, and also claims the benefit of U.S. Provisional Application Ser. Nos. 61/019,575, filed on Jan. 7, 2008, 60/984,711, filed on Nov. 1, 2007, and 60/971,921, filed on Sep. 13, 2007.

TECHNICAL FIELD

The present invention relates to a wireless mobile communication system, and more particularly, to a method in which a terminal receives control information from a network in a wireless mobile communication system.

BACKGROUND ART

A variety of data and services are transmitted and provided in an Evolved Universal Terrestrial Radio Access Network (E-UTRAN) according to an asynchronous mobile communication system standard (3GPP). Examples of such data and services include system information transmitted through a Broadcast Channel (BCH), a control message transmitted through a Physical Downlink Control Channel (PDCCH), user traffic or a control message transmitted through a downlink/uplink Shared Channel (SCH), Broadcast/Multicast Service (MBMS) traffic or a control message transmitted through a downlink SCH or a downlink Multicast Channel (MCH), and an initial uplink control message transmitted through a Random Access Channel (RACH).

As a kind of broadcast/multicast service, the Multimedia Broadcast Multicast Service (MBMS) provides a streaming or background service to a plurality of UEs using a MBMS bearer service which is dedicated for a downlink. The term "broadcast/multicast service" or "MBMS" used in this disclosure can be replaced with other terms such as "point-to-multipoint service" or "Multicast and Broadcast Service (MBS)". The MBMS is based on IP multicast, and thus terminals share resources required for data packet transmission and receive the same multimedia data. Accordingly, the MBMS can increase resource efficiency when more than a specific number of terminals are present in the same cell. The MBMS service is not associated with RRC connection, and thus even terminals in a sleep mode can receive the service.

The MBMS service is provided according to two modes, a broadcast mode and a multicast mode. One sender transmits data to all recipients in the broadcast mode and one or more senders transmit data to one or more specific recipients in the multicast mode. In the multicast method, the recipient needs to transfer the intention of receiving data to the network and can subscribe and leave a group.

One MBMS service includes one or more sessions and MBMS data is transmitted to a plurality of terminals (or user equipments) through a MBMS bearer service only when a session is ongoing. The system provides a MBMS bearer service to a terminal using a radio bearer. Radio bearer types used in the system are divided into a MTCH (MBMS Traffic Channel or Multicast Traffic Channel) and a MCCH (Multicast Control Channel). The MTCH, which is a logical channel, is configured for each MBMS service provided to one cell and is used to transmit user plane data to a plurality of terminals of a specific MBMS service. The MCCH, which is a logical channel, is used to transmit MTCH configuration (or setting) information or MBMS service configuration information in a cell to a terminal, in order to allow the terminal to receive service data through the MTCH.

DISCLOSURE OF THE INVENTION

Technical Problem

Conventionally, when a terminal has subscribed a MBMS service, the terminal constantly monitors a MCCH or a MTCH to receive data or control information associated with the service. However, data of a MBMS service is not always transmitted to a terminal even when the terminal has subscribed the MBMS service. To reduce waste of power, the terminal needs to receive a MTCH only when the service is provided. The terminal needs to receive a MCCH, through which control information of a service is transmitted, only when a change has been made in information associated with the service that the terminal desires to receive among several information transmitted through the MCCH. That is, the terminal needs to receive a MTCH or a MCCH only when a change has been made in the operating state of the MTCH or information transmitted through the MCCH.

In some case, a base station may need to release connection to a plurality of terminals due to shortage of internal resources or errors in internal functions. If the base station transmits a message requesting a release of a call at this time to each terminal, this will increase system load.

An object of the present invention devised to solve the problem lies in providing a method for reducing resource waste and overhead in a procedure in which terminal receives control information from a network.

Another object of the present invention devised to solve the problem lies in providing a method for simultaneously or selectively receiving control information associated with different kinds of services using a paging procedure.

A further object of the present invention devised to solve the problem lies in providing a method in which a terminal receives control information associated with MBMS service only when information associated with the MBMS service has been changed.

Objects of the present invention are not limited to those described above and other objects will be clearly understood by those skilled in the art from the following description.

Technical Solution

An embodiment of the present invention is characterized in that a terminal or User Equipment (UE) selectively or simultaneously receives control information associated with a plurality of different services through a paging procedure. Preferably, a type indicator indicating a paging type is used to identify of service types in a procedure for receiving control information using the paging. A paging identifier used to page a terminal may also be used to indicate a paging type.

In an aspect of the present invention, provided herein is a method of receiving control information by a user equipment from a network in a wireless mobile communication system, the method including the steps of receiving a paging identifier indicating whether or not a paging message to be transmitted to the user equipment is present, and receiving the paging message including a type indicator indicating a paging type, according to the paging identifier.

In another aspect of the present invention, provided herein is a method of receiving control information by a user equipment from a network in a wireless mobile communication system, the method including the steps of receiving at least one paging identifier indicating whether or not a paging message to be transmitted to the user equipment is present, receiving a first paging message for a first service when the received paging identifier is a first paging identifier, and receiving a second paging message for a second service when the received paging identifier is a second paging identifier.

In another aspect of the present invention, provided herein is a method of transmitting control information by a network in a wireless mobile communication system, the method including the steps of transmitting a paging identifier to a user equipment, the paging identifier indicating whether or not a paging message to be transmitted to the user equipment is present, and transmitting the paging message including a type indicator to the user equipment, the type indicator indicating a paging type determined according to the type of a service to be provided to the user equipment.

In another aspect of the present invention, provided herein is a method of transmitting control information by a network in a wireless mobile communication system, the method including the steps of transmitting at least one paging identifier to a user equipment, the paging identifier indicating whether or not a paging message to be transmitted to the user equipment is present and indicating the type of a service to be provided to the user equipment, transmitting a first paging message for a first service to the user equipment when the paging identifier is a first identifier, and transmitting a second paging message for a second service to the user equipment when the paging identifier is a second identifier.

Advantageous Effects

Embodiments of the present invention have the following advantages.

First, it is possible to reduce resource waste and overhead in a procedure in which a terminal receives control information from a network.

Second, it is possible to simultaneously or selectively receive control information associated with different kinds of services using a paging procedure.

Third, it is possible to receive control information associated with a broadcast/multimedia service only when information associated with the broadcast/multimedia service has been changed.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Mode for Invention

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (E-UMTS).

Figure 1:
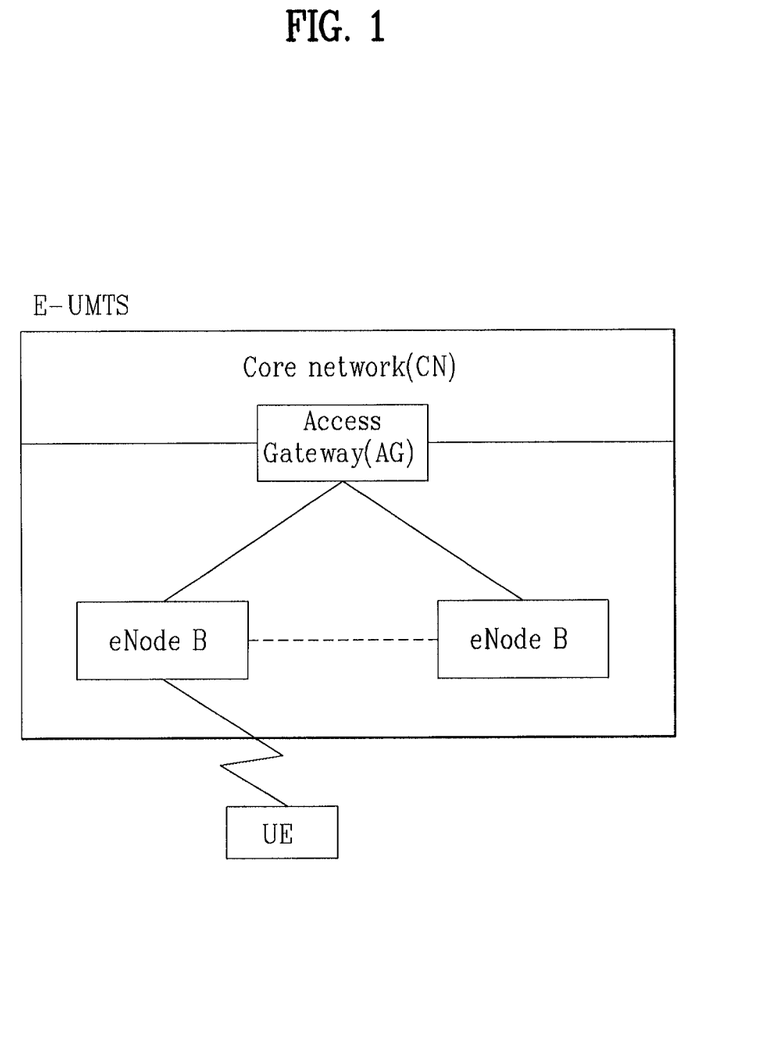
FIG. 1 illustrates a network structure of an E-UMTS.

FIG. 1 shows a network structure of the E-UMTS to which an embodiment of the present invention is applied. The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

As shown in FIG. 1, the E-UMTS mainly includes a User Equipment (UE), a base station (or eNB or eNode B), and an Access Gateway (AG) which is located at an end of a network (E-UTRAN) and which is connected to an external network. Generally, an eNB can simultaneously transmit multiple data streams for a broadcast service, a multicast service and/or a unicast service. AGs can be divided into AGs responsible for processing user traffic and AGs responsible for processing control traffic. Here, an AG for processing new user traffic and an AG for processing control traffic can communicate with each other using a new interface. One or more cells are present for one eNB. An interface for transmission of user traffic or control traffic can be used between eNBs. A Core Network (CN) may include an AG and network nodes for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies that the TA where the UE is located has been changed.

Figure 2:
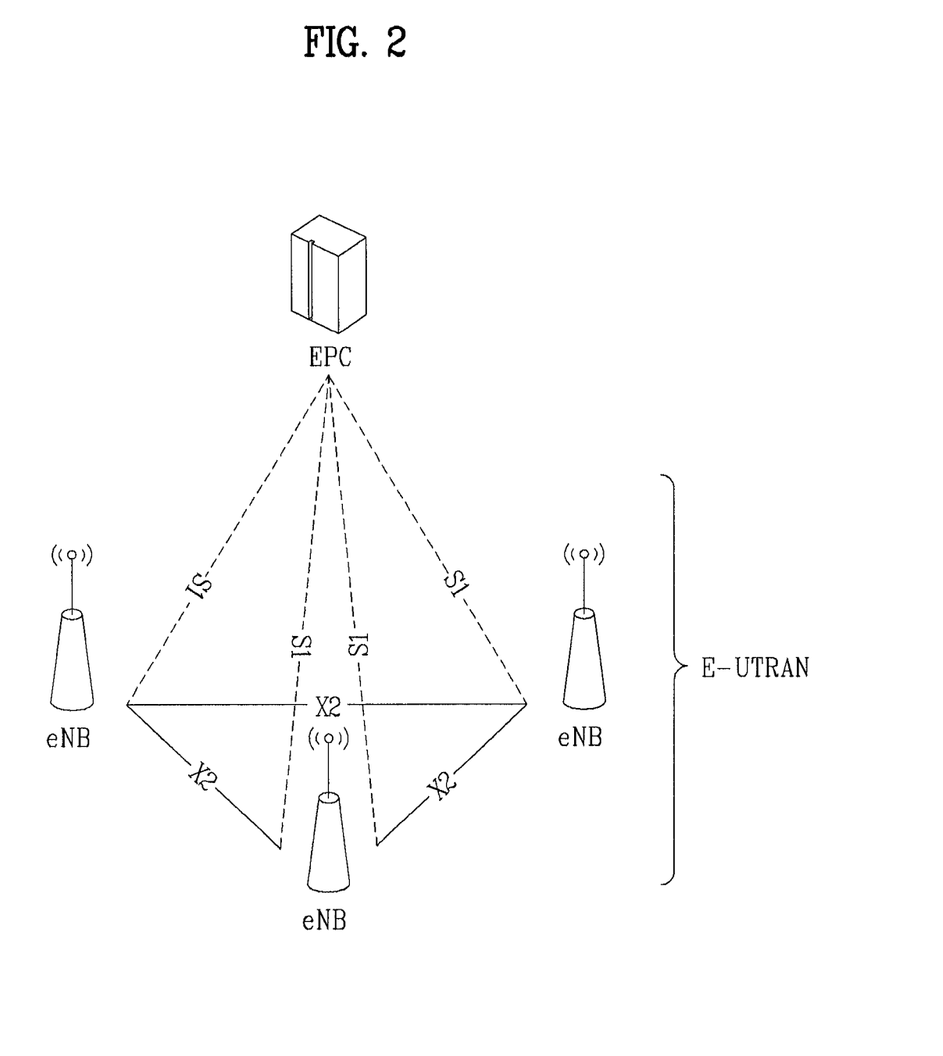
FIG. 2 illustrates a schematic structure of an Evolved Universal Terrestrial Radio Access Network (E-UTRAN).

FIG. 2 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes a base station that will also be referred to as "eNode B" or "eNB". The eNBs are connected through X2 interfaces. Each eNB is connected to User Equipments (UEs) through a radio interface and is connected to an Evolved Packet Core (EPC) through a S1 interface.

Figure 3A:
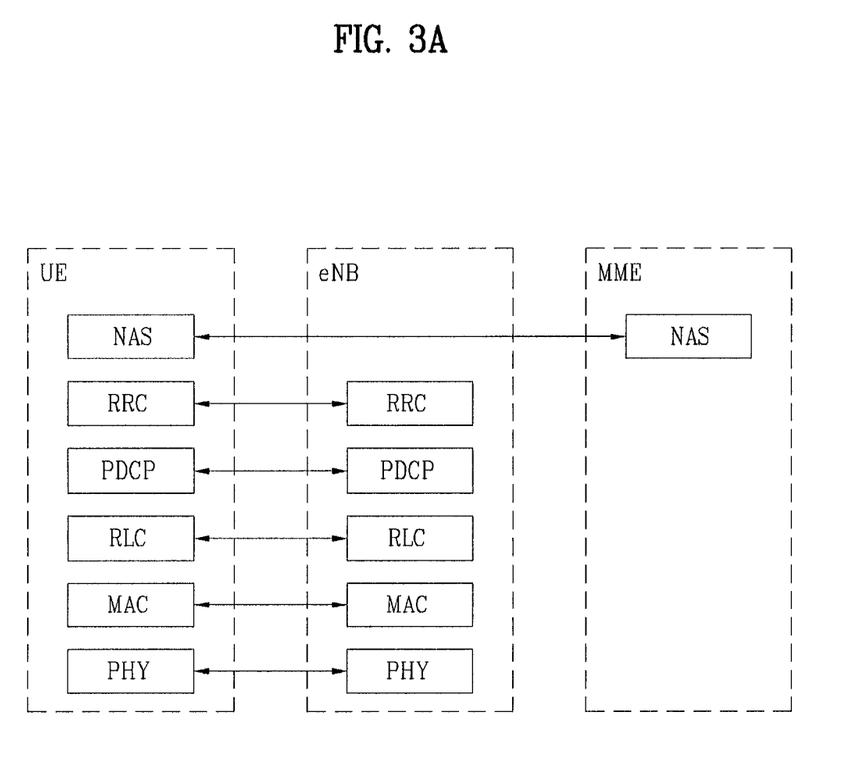
FIGS. 3A and 3B illustrate the configurations of control plane and a user plane of a radio interface protocol between a UE and an E-UTRAN.
Figure 3B:
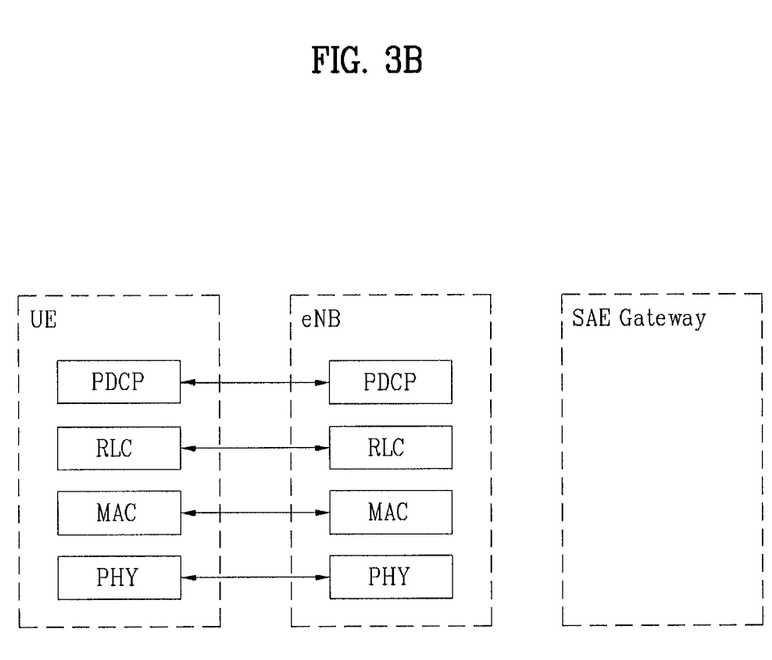

FIGS. 3A and 3B illustrate the configurations of a control plane and a user plane of a radio interface protocol between a UE and a UMTS Terrestrial Ratio Access Network (UTRAN) based on the 3GPP radio access network standard. The radio interface protocol is divided horizontally into a physical layer, a data link layer, and a network layer and vertically into a user plane for data information transmission and a control plane for signaling. The protocol layers of FIGS. 3A and 3B can be divided into a L1 layer (first layer), a L2 layer (second layer) and a L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the radio protocol control and user planes.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transfer. The functions of the RLC layer may also be implemented through internal functional blocks of the MAC layer. In this case, the RLC layer need not be provided. A PDCP layer of the second layer performs a header compression function to reduce unnecessary control information in order to efficiently transmit IP packets such as IPv4 or IPv6 packets in a radio interval with a relatively narrow bandwidth.

A Radio Resource Control (RRC) layer located at the bottom of the third layer is defined only in the control plane and is responsible for control of logical, transport, and physical channels in association with configuration, re-configuration and release of a Radio Bearer (RB). The RB is a service that the second layer provides for data communication between the UE and the UTRAN. To accomplish this, the RRC layer of the UE and the RRC layer of the network exchange RRC messages. The UE is in RRC connected mode if RRC connection has been established between the RRC layer of the radio network and the RRC layer of the UE. Otherwise, the UE is in RRC idle mode.

A Non-Access Stratum (NAS) layer located above the RRC layer performs functions such as session management and mobility management.

One cell of the eNB is set to a bandwidth of 1.25, 2.5, 5, 10 or 20 MHz and provides a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
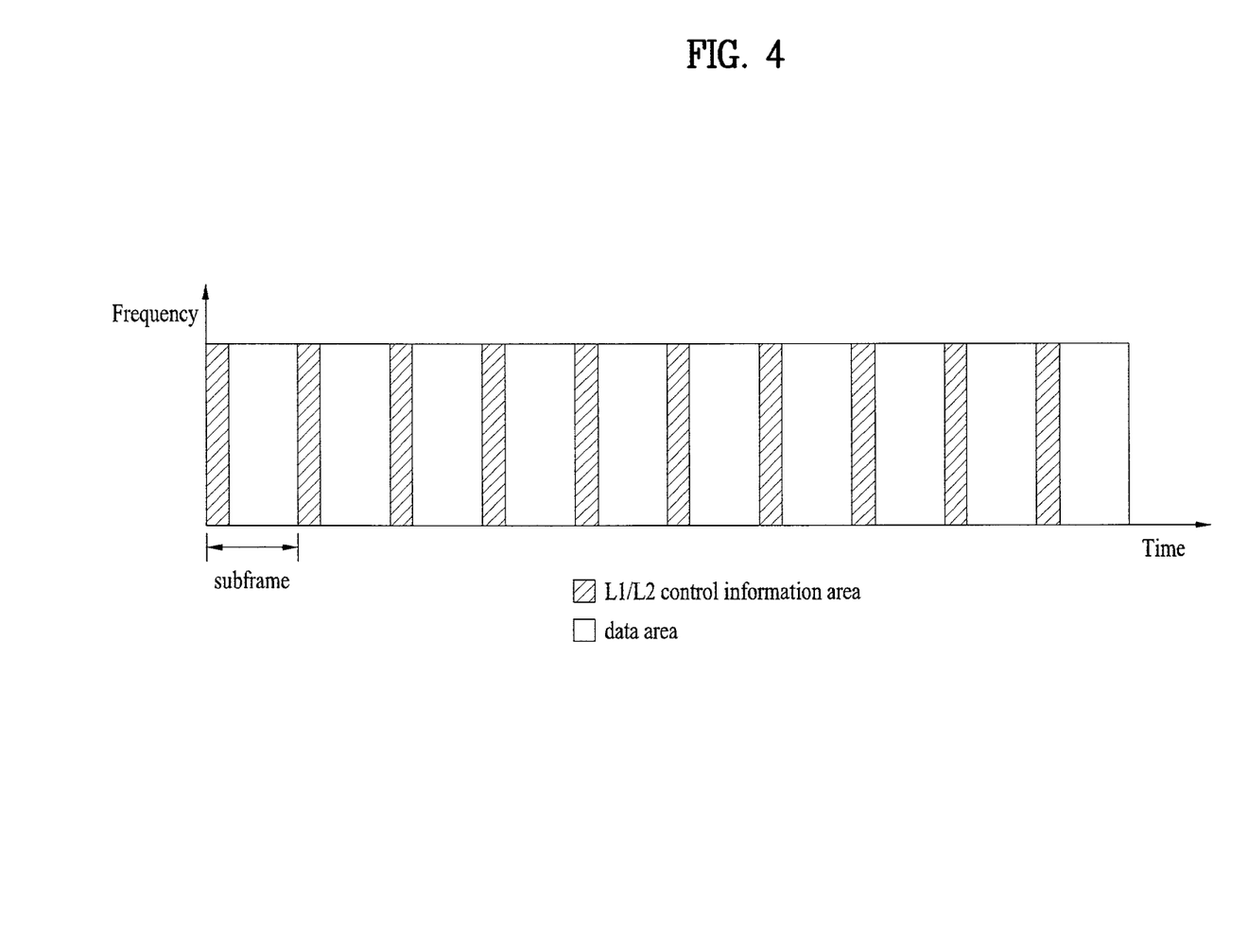
FIG. 4 illustrates an example structure of a physical channel used in an E-UMTS system.

FIG. 4 illustrates an example of a physical channel structure used in an E-UMTS system. A physical channel includes a plurality of subframes on the time axis and a plurality of subcarriers on the frequency axis. Here, one subframe includes a plurality of symbols on the time axis. One subframe includes a plurality of resource blocks and one resource block includes a plurality of symbols and a plurality of subcarriers. Each subframe can use specific subcarriers of a specific symbol (e.g., a first symbol) in the subframe as a Physical Downlink Control Channel (PDCCH) (i.e., a L1/L2 control channel). A L1/L2 control information transmission region (hatched part) and a data transmission region (unhatched part) are shown in FIG. 4. The Evolved Universal Mobile Telecommunications System (E-UMTS), which is currently under discussion, uses 10 ms radio frames, each including 10 subframes. Each subframe includes two consecutive slots, each of which is 0.5 ms long. One subframe includes multiple OFDM symbols. Some OFDM symbols, e.g. the first symbol, can be used to transmit L1/L2 control information. A Transmission Time Interval (TTI), which is a unit time during which data is transmitted, is 1 ms.

Figure 5:
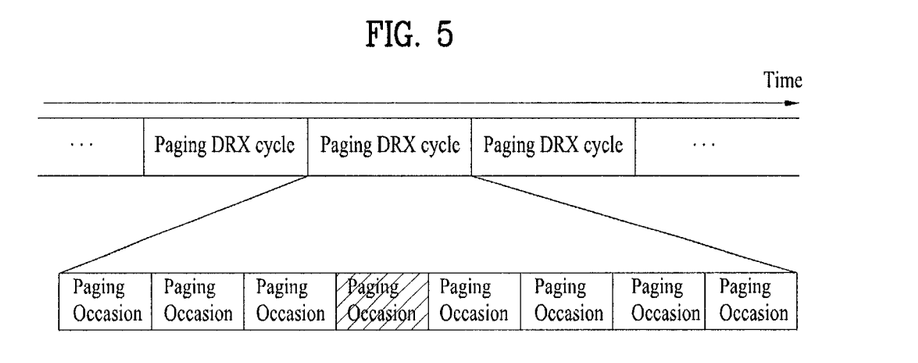
FIG. 5 illustrates example transmission of a paging channel used in an E-UMTS system.

FIG. 5 illustrates an exemplary transmission of paging channel used in the E-UMTS system. When receiving a paging message, a User Equipment (UE) can perform Discontinuous Reception (DRX) in order to reduce power consumption. To accomplish this, the network constructs a number of paging occasions in each period of time, which is referred to as a "paging DRX cycle", and allows a specific UE to receive a specific paging occasion to obtain a paging message. The UE does not monitor paging channel at any time other than the specific paging occasion. One paging occasion corresponds to one TTI.

The UE receives a downlink channel every specified paging occasion. Specifically, at each paging occasion, the UE awakes to monitor a PDCCH. When the UE receives a Paging-RNTI (P-RNTI) corresponding to paging through the PDCCH, the UE receives a radio resource indicated by the PDCCH. An actual paging message is transmitted through the radio resource. The UE receives the paging message and checks whether or not an identifier is identical to an identifier of the UE (i.e., an identifier such as an International Mobile Subscriber Identity (IMSI) allocated to the UE) is present in the paging message. When an identical identifier is present, the UE transfer the paging message to an upper layer.

Figure 6:
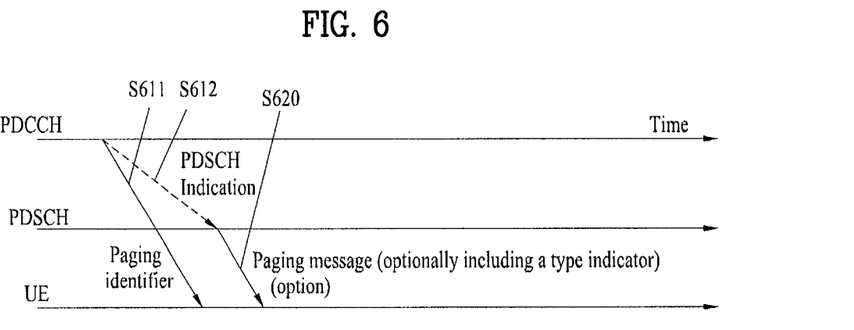
FIG. 6 illustrates an embodiment of the present invention.

FIG. 6 illustrates an embodiment of the present invention.

As shown in FIG. 6, the UE awakes at a specific paging occasion assigned to the UE in a specific paging period (e.g., a DRX cycle) and monitors a PDCCH as described above with reference to FIG. 5. Through the PDCCH, the UE receives a paging identifier indicating whether or not a paging message addressed to the UE is present (S611). When no paging identifier is received, the UE moves to a sleep mode and thereafter awakes at a specific paging occasion of a next paging period and monitors the PDCCH.

The paging identifier may be anything indicating presence of a paging message to the UE. For example, the paging identifier may also be a specific bit or a bit sequence. The paging identifier may also be indicated by a specific code.

That is, the paging identifier may be cell-specific, service-specific or group-specific. That is, the paging identifier is common to all UEs in a cell, all UEs associated with a specific service or all UEs in a group formed under a specific condition. The term "paging identifier" has been defined for explanation of the present invention and can be replaced with another equivalent term that can be derived from the above description. For example, the term "paging identifier" can be replaced with "Paging Identification Information", "paging indicator", "paging indication", "paging information", or the like.

The paging identifier may be a Paging-Radio Network Temporary Identifier (P-RNTI), a MBMS Paging-RNTI (MP-RNTI), a MCCH notification RNTI, a MBMS service-ID or any combination thereof. Preferably, the paging identifier is a P-RNTI, a MP-RNTI, or a combination of a P-RNTI and a MP-RNTI. When a plurality of paging identifiers is used, the paging identifiers may be used selectively or together during a specific paging occasion. When a plurality of paging identifiers is used, each paging identifier may indicate the type of paging to be provided to the UE in addition to presence of a message to be transmitted to the UE. For example, if the UE receives a MP-RNTI through a PDCCH when a P-RNTI and a MP-RNTI are used as the paging identifiers, the UE can determine that the content of the paging message is associated with a MBMS. The UE may also receive the P-RNTI and the MP-RNTI at the same time. The paging identifier can also indicate to the UE that the content of the paging message is associated with a UE-dedicated terminating call or a UE group command.

When a UE has received a paging identifier at a specific paging occasion, the UE can receive an indication associated with a PDSCH which is transmitted together with the paging identifier (S612). The indication indicates a radio resource for receiving a paging message in a PDSCH.

The UE can receive the paging message from a PDSCH according to the PDSCH indication (or scheduling information) (S620). The paging message may include at least one control information regarding different types of services associated with the UE. Preferably, the paging message includes a type indicator indicating a paging type. The paging type is the type of a service or the type of control information to be provided to the UE through a paging procedure. The service or control information will be described in more detail in the following description of the type indicator. Preferably, the paging message includes the same number of type indicators as the number of the different types of services.

The type indicator may be anything indicating the paging type to the UE. For example, the type indicator may be a specific bit or a bit sequence. The type indicator may be cell-specific, service-specific or group-specific. The term "type indicator" has been defined for explanation of the present invention and can be replaced with another equivalent term that can be derived from the above description. For example, the term "type indicator" can be replaced with "paging type indicator", "paging type information", "paging type indication", "paging type identifier", "paging type identification information", "type identifier", "type identification information" or the like.

The paging type which the type indicator can indicate to the UE may be a service or control information associated with the UE or a various combinations thereof. For example, the type indicator may indicate whether the paging is associated with a MBMS service, a UE (or terminal)-dedicated terminating call or a UE group command. In this case, the type indicator may be a unique identifier, unique identification information or a unique index that is defined according to the paging type. The type indicator may also be an MBMS service identifier indicating a specific MBMS service or a UE identifier (e.g., IMSI or Cell-RNTI (C-RNTI)) indicating a specific UE. What is used as paging type indicator is the problem of implementation and thus the present invention is not limited to a specific implementation.

When the type indicator indicates that the paging is for a MBMS service, the UE can receive control information associated with the MBMS service. For example, the control information associated with the MBMS service includes information as to whether or not a specific MBMS service has started, whether or not a change has been made in MTCH configuration information associated with the specific MBMS service, or whether or not a change has been made in control information transmitted in a MCCH associated with the MBMS service.

For example, when a change has been made in MBMS related control information transmitted in a cell, the base station can indicate to the user that a paging message to be transmitted is present using P-RNTI. In this case, the UE receives a paging message indicated by the P-RNTI. The paging message may include a type indicator and the type indicator may indicate whether the paging is for a specific UE or a MBMS service. If the paging is for a MBMS service, the paging message may additionally include an identifier of an associated MBMS service. In this case, the UE receives control information associated with the MBMS service if the MBMS service identifier included in the paging message is identical to a MBMS service identifier of a MBMS service which the user has subscribed.

The base station may indicate to the UE whether or not a change has been made in control information associated with the MBMS service using a specific RNTI for MBMS paging (i.e., a MP-RNTI). In this case, a paging message transmitted using a radio resource indicated by the MP-RNTI may include identifiers of at least one MBMS service whose control information has been changed. More specifically, the UE attempts to receive a MP-RNTI during a paging occasion of the UE. If the UE has subscribed one or more MBMS services and one or more identifiers of the MBMS services which the UE has subscribed are included in a paging message indicated by the MP-RNTI, the UE additionally receives control information associated with MBMS reception. The control information can be transmitted through a MCCH. In this case, a special RNTI (i.e., an MCCH-RNTI) is used.

When the UE has not subscribed a MBMS service, the UE ignores a paging message associated with a MP-RNTI or does not receive control information through a MCCH.

When the type indicator indicates that the paging is for a UE-dedicated terminating call and an identifier in the paging message is identical to an identifier of the UE, the UE notifies an upper layer that the terminating call has been received.

When the type indicator indicates that the paging is associated with a UE group command, the UE additionally receives information of commands common to a plurality of UEs. The information of the common commands of the plurality of UEs includes information requesting that the UEs move to a specific cell, release a RRC connection, transmit a specific message to a base station, perform a specific procedure or provide a paging response to the base station.

The information of the common commands of the plurality of UEs may include identification information associated with UEs to which the common commands are applied. The information associated with the UEs includes a UE identifier list. Preferably, the information associated with the UEs may be an end or start portion of the identifier of each of the UEs. The base station may previously notify UEs in a group of an identifier associated with the UE group and then may use the identifier associated with the UE group to transmit commands commonly applied to the UEs.

In another embodiment, the paging identifier may be transmitted together with a type indicator in order to save power of the UE. For example, when a P-RNTI is transmitted through a PDCCH, the type indicator may also be transmitted through the PDCCH. In this case, power can be saved since a UE not associated with a paging type, which is indicated by the type indicator, does not need to attempt to receive a radio resource indicated by the P-RNTI. For example, when the type indicator indicates information associated with a MBMS service, UEs which have not subscribed the MBMS service can return to a sleep mode after reading only the PDCCH.

Figure 7:
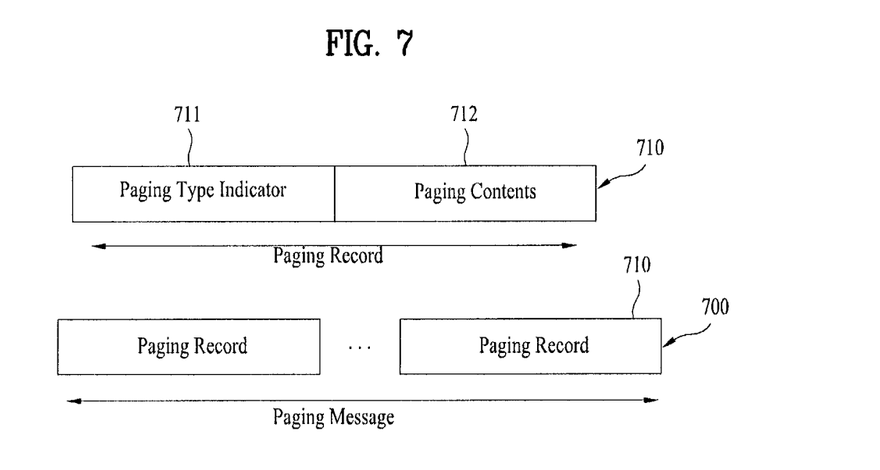
FIG. 7 illustrates a structure of a paging message according to an embodiment of the present invention.

FIG. 7 illustrates a structure of the paging message according to an embodiment of the present invention.

As shown in FIG. 7, the paging message 700 includes at least one paging record 710. Each paging record includes information of each type of paging. Each paging record includes a paging type indicator 711 and paging content 712. When only one paging record 710 is included in the paging message 700, the paging type indicator 711 need not be included in the paging record 710.

The paging type indicator 711 indicates the paging type of the related paging record 710. As described above, the paging type indicator 711 may be a specific bit or a bit sequence indicating the paging type. The paging type indicator 711 may be a unique identifier, unique identification information or a unique index that is defined according to the paging type. The type indicator may be UE-specific, service-specific or group-specific.

For example, the paging type indicator 711 indicates whether the related paging record 710 is associated with a MBMS service, a UE-dedicated terminating call or a UE group command. When the paging type indicator 711 indicates that the related paging record 710 is associated with a MBMS service, the paging content 712 in the related paging record 710 may further include information associated with MBMS service reception. /For example, the paging content 712 may further include a MBMS service identifier or the like. When the paging type indicator 711 indicates that the related paging record 710 is associated with a UE-dedicated terminating call, the paging content 712 further includes information indicating that a terminating call is addressed to a specific UE. For example, the paging content 712 includes an identifier of a UE that is paged. When the paging type indicator 711 indicates that the related paging record 710 is associated with a UE group command, the paging content 712 further includes information of commands common to a plurality of UEs. Details of the information of commands common to a plurality of UEs and the information associated with receiving MBMS service are similar to those illustrated in FIG. 6.

Figure 8:
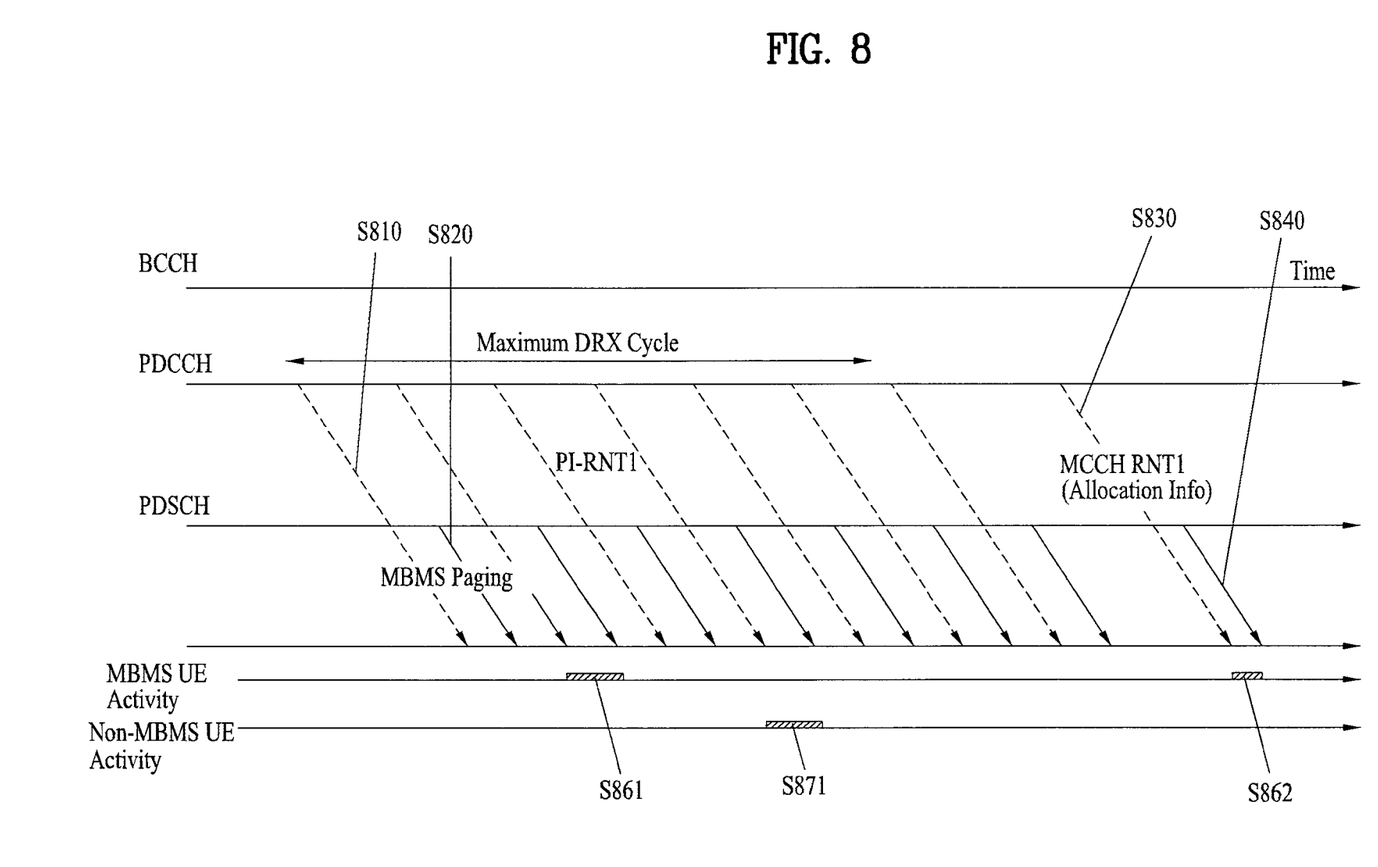
FIG. 8 illustrates another embodiment of the present invention.

FIG. 8 illustrates another embodiment of the present invention.

As shown in FIG. 8, a base station broadcasts a paging identifier to all UEs in a cell through a PDCCH every paging occasion of a maximum DRX cycle (S810). In the embodiment of FIG. 8, the paging identifier is a P-RNTI. A PDSCH indication (or scheduling information) is transmitted together with the P-RNTI through the PDCCH. The PDSCH indication is information associated with a transmission format (e.g., a transmission block size, modulation, coding information, etc) and/or a radio resource in the PDSCH indicated by the P-RNTI. The UE receives a paging message indicated by the P-RNTI through the radio resource in the PDSCH (S820).

In the embodiment of FIG. 8, the paging message includes information associated with a MBMS service.

A description will now be given focusing on the operation of a UE that receives a paging message.

The UE awakes every paging occasion assigned to the UE and attempts to receive a PDCCH. Two types of UEs are illustrated in FIG. 8. The first UE is associated with a MBMS service (MBMS UE) and the second UE is not associated with a MBMS service (non-MBMS UE). The first UE awakes at a second paging occasion in the maximum DRX cycle and attempts to receive a PDCCH (S861). On the other hand, the second UE awakes at a fourth paging occasion in the maximum DRX cycle and attempts to receive a PDCCH (S871). In FIG. 8, it is assumed that each of the first and second UEs has received a P-RNTI at the corresponding paging occasion.

After receiving the P-RNTI, each of the first and second UEs decodes a radio resource indicated by the PDSCH indication (or scheduling information) and receives related paging message (S861 and S871). The paging message includes a type indicator indicating a paging type. Here, it is assumed that the type indicator indicates that the paging message is associated with a MBMS service.

The first UE can additionally receive control information associated with the MBMS service since the first UE is associated with the MBMS service. For example, the first UE attempts to receive a MCCH-RNTI through an MCCH (S830 and S862). Upon receiving the MCCH-RNTI, the first UE receives control information associated with MBMS reception (S840 and S862). In this process, if the paging message includes a MBMS service identifier of at least one MBMS service for which control information has been changed, the first UE can additionally receive control information associated with MBMS service reception only when the MBMS service identifier included in the paging message is identical to the identifier of a MBMS service which the UE has subscribed (S861 and S862).

When the type indicator indicates information associated with MBMS service reception and the paging message indicates that the UE will respond to a base station, the first UE starts a procedure for responding to the base station if a MBMS service which the first UE has subscribed is present. For example, the first UE starts the procedure for responding to the base station if an identifier of a MBMS service which the first UE has subscribed is included in the paging message.

On the other hand, when the second UE has confirmed that the paging message is associated with a MBMS service through the type indicator, the second UE no longer receives control information associated with a MBMS service.

Although not illustrated in FIG. 8, the paging message may include a UE-dedicated terminating call or a UE group command. The paging message may include at least one of information associated with a MBMS service, a UE-dedicated terminating call or a UE group command. For example, the paging message may include a plurality of control commands associated with different types of services. When a plurality of control commands is included in one paging message, control commands for different types of services are included in units of paging records illustrated in FIG. 7. In this case, each paging record may include one type indicator.

For example, when the type indicator indicates a UE-dedicated terminating call, the corresponding UE compares a UE identifier included in each paging record with an identifier assigned to the UE. If the UE identifier in the paging record is identical to the identifier assigned to the UE, the UE transfers the paging record to an upper layer. In addition, if the type indicator associated with the paging record indicates information of commands common to a plurality of UEs, the UE compares UE identifiers included in the paging record with an identifier assigned to the UE. If the UE identifier in the paging record is identical to the identifier assigned to the UE, the UE performs a command included in the paging record. If no command is included in the paging record, the UE performs basic operations. Here, basic operations may be specified through system information. The UE may perform an operation for releasing a call or releasing RRC connection as a basic operation.

Figure 9:
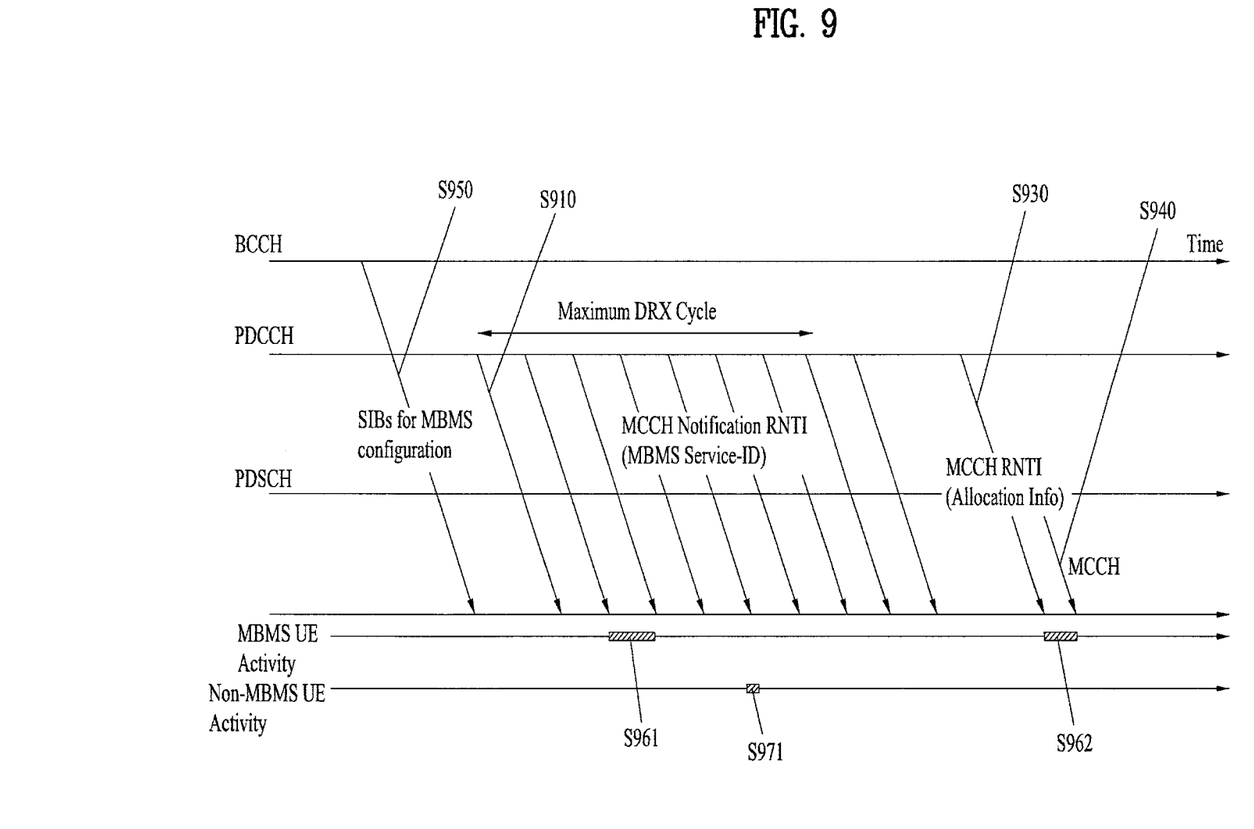
FIG. 9 illustrates yet another embodiment of the present invention.

FIG. 9 illustrates another embodiment of the present invention. The embodiment of the FIG. 9 is basically similar to that of FIG. 8, except that a MP-RNTI or a MCCH notification RNTI is used as a paging identifier. Reference will now be made mainly to differences from FIG. 8.

A UE that has subscribed a MBMS service can previously receive system information associated with the MBMS service through a BCCH (S950). The system information includes information regarding a MP-RNTI, MCCH notification RNTI or MCCH-RNTI associated with a MCCH.

As in FIG. 8, each of the first UE (MBMS UE) and the second UE (non-MBMS UE) awakes at a specific corresponding paging occasion and attempts to receive a PDCCH (S961 and S971).

When the first UE has received a MP-RNTI or a MCCH notification RNTI as a paging identifier through a PDCCH, the first UE can additionally receive control information associated with a MBMS service (S962). In the embodiment of FIG. 9, the first UE attempts to receive a MCCH-RNTI through a MCCH (S930 and S962) and then receives control information associated with the MBMS service (S940 and S962). The first UE can additionally receive an identifier of a MBMS service for which control information has been changed. The identifier of the MBMS service for which control information has been changed may be transmitted together with the paging identifier through a PDCCH or may be included in a paging message transmitted through a PDSCH using a radio resource indicated by the paging identifier. In this case, the first UE checks whether or not the paging identifier has been received and then additionally receives control information associated with a MBMS service when an identifier of a MBMS service for which the UE has subscribed is identical to the MBMS service identifier transmitted through the PDCCH or PDSCH (S961).

On the other hand, the second UE returns to a sleep mode after confirming that the received paging identifier is associated with a MBMS service.

Although the MP-RNTI or MCCH notification RNTI is used as an example of the paging identifier in FIG. 9, it may be may also be used in combination with a P-RNTI. In this case, when a P-RNTI is received as the paging identifier, the first and second UEs perform operations according to the control information of the received paging message. The paging message may include only general control information associated with paging. The paging message may also include control information of other types of services and corresponding type indicators. When a type indicator is included in the paging message, the UEs can operate in a manner similar to that described above in the embodiment of FIG. 8.

In the present invention, control information associated with different services can be selectively or simultaneously received using the paging method. Accordingly, the present invention can efficiently reduce overhead and waste of radio resources required to provide control information to a UE. In addition, the present invention is simply implemented since the conventional paging method that has been used to page a specific UE is used.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The above embodiments of the present invention have been described focusing mainly on the data communication relationship between a UE (or terminal) and a Base Station (BS). Specific operations which have been described as being performed by the BS may also be performed by upper nodes as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", "mobile station (MS)", or "mobile subscriber station (MSS)".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so that it can be executed by a processor. The memory unit may be located inside or outside the processor and can communicate data with the processor through a variety of known means.

INDUSTRIAL APPLICABILITY

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. A method of receiving control information by a user equipment from a network in a wireless mobile communication system, the method comprising:
   receiving a paging identifier indicating whether a paging message to be transmitted to the user equipment is present, wherein the paging identifier further indicates that a paging is associated with a user equipment group command;
   receiving the paging message including a user equipment identifier and a type indicator indicating a paging type, according to the paging identifier;
   checking whether the user equipment identifier included in the paging message is identical to an identifier of the user equipment; and
   receiving information of commands common to a plurality of user equipments when the paging identifier further indicates that a paging is associated with a user equipment group command,
   wherein the information of the common commands includes information requesting that the plurality of user equipments move to a special cell, release a Radio Remote Control (RRC) connection, transmit a specific message to a base station, or perform a specific procedure.

2. A method of receiving control information by a user equipment from a network in a wireless mobile communication system, the method comprising:
   receiving at least one paging identifier indicating whether a paging message to be transmitted to the user equipment is present;
   receiving the paging message including a user equipment identifier, wherein the user equipment identifier is an identifier of the user equipment;
   receiving a first paging message for a first service when the received at least one paging identifier is a first paging identifier;
   receiving a second paging message for a second service when the received at least one paging identifier is a second paging identifier; and
   receiving information of commands common to a plurality of user equipments when the at least one paging identifier further indicates that a paging is associated with a user equipment group command,
   wherein the information of the common commands includes information requesting that the plurality of user equipments move to a special cell, release a Radio Remote Control (RRC) connection, transmit a specific message to a base station, or perform a specific procedure.

3. A method of transmitting control information by a network in a wireless mobile communication system, the method comprising:
   transmitting a paging identifier to a user equipment, the paging identifier indicating whether a paging message to be transmitted to the user equipment is present;
   transmitting the paging message including a user equipment identifier and a type indicator to the user equipment, the type indicator indicating a paging type determined according to a type of a service to be provided to the user equipment, wherein the user equipment identifier included in the paging message is an identifier of the user equipment; and
   transmitting information of commands common to a plurality of user equipments to the user equipment when the paging identifier further indicates that a paging is associated with a user equipment group command,
   wherein the information of the common commands includes information requesting that the plurality of user equipments move to a special cell, release a Radio Remote Control (RRC) connection, transmit a specific message to a base station, or perform a specific procedure.

4. A method of transmitting control information by a network in a wireless mobile communication system, the method comprising:
   transmitting at least one paging identifier to a user equipment, the paging identifier indicating whether a paging message to be transmitted to the user equipment is present and indicating a type of a service to be provided to the user equipment;
   receiving a user equipment identifier, wherein the user equipment identifier included in the paging message is identical to an identifier of the user equipment;
   transmitting a first paging message for a first service to the user equipment when the paging identifier is a first identifier;
   transmitting a second paging message for a second service to the user equipment when the paging identifier is a second identifier; and
   transmitting information of commands common to a plurality of user equipments to the user equipment when the at least one paging identifier further indicates that a paging is associated with a user equipment group command,
   wherein the information of the common commands includes information requesting that the plurality of user equipments move to a special cell, release a Radio Remote Control (RRC) connection, transmit a specific message to a base station, or perform a specific procedure.

* * * * *